United States Patent
Periadurai et al.

(10) Patent No.: US 10,073,678 B2
(45) Date of Patent: Sep. 11, 2018

(54) LOCATING FEATURES IN A LAYERED SOFTWARE APPLICATION

(71) Applicant: International Business Machines Corporation, Armonk, NY (US)

(72) Inventors: Shunmuga R. Periadurai, Ayanpuram (IN); Manjur I. Sayed, Bangalore (IN); Tincy Sebastian, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/287,671

(22) Filed: Oct. 6, 2016

(65) Prior Publication Data
US 2018/0101363 A1 Apr. 12, 2018

(51) Int. Cl.
*G06F 9/44* (2018.01)
*G06F 8/20* (2018.01)

(52) U.S. Cl.
CPC .................................. *G06F 8/20* (2013.01)

(58) Field of Classification Search
None
See application file for complete search history.

(56) References Cited

U.S. PATENT DOCUMENTS

| | | | |
|---|---|---|---|
| 6,266,805 B1* | 7/2001 | Nwana | G06F 9/4862 714/35 |
| 6,269,473 B1* | 7/2001 | Freed | G06F 8/20 703/22 |
| 7,117,495 B2 | 10/2006 | Blaser et al. | |
| 8,793,667 B1* | 7/2014 | Huang | G06F 11/3604 717/131 |
| 9,170,809 B1* | 10/2015 | Cohen | G06F 11/3672 |
| 2007/0226716 A1 | 9/2007 | Chen | |
| 2008/0168424 A1* | 7/2008 | Mohindra | G06F 8/61 717/120 |
| 2009/0133006 A1* | 5/2009 | Cheung | G06F 8/71 717/144 |
| 2010/0100867 A1* | 4/2010 | Sindhgatta | G06F 8/75 717/105 |
| 2012/0005236 A1* | 1/2012 | Deng | G06F 8/10 707/798 |
| 2012/0054714 A1 | 3/2012 | Novak et al. | |
| 2017/0034015 A1* | 2/2017 | Li | G06F 8/61 |

* cited by examiner

*Primary Examiner* — Daxin Wu
(74) *Attorney, Agent, or Firm* — Cuenot, Forsythe & Kim, LLC (57) ABSTRACT

A new feature can be defined for an application. Data pertaining to layer information, service information, feature information and dependency information for the application can be processed and, based on the processing, an identification can be made of a highest layer of a plurality of layers of the application containing at least one service or at least a second feature upon which the new feature is dependent. A recommendation can be rendered. The recommendation can indicate to place the new feature in the highest layer of the plurality of layers containing the at least one service or at least the second feature upon which the new feature is dependent.

20 Claims, 8 Drawing Sheets

200

For each of a plurality of layers defined for the application, store data pertaining to the layer as layer information
202

For each of a plurality of features defined for the application, store data pertaining to the feature as feature information
204

For each of a plurality of services defined for the application, store data pertaining to the service as service information
206

Store data pertaining to dependencies among the features and services as dependency information
208

```
For each of a plurality of layers defined for the application, store data pertaining to the
layer as layer information
202
```
↓
```
For each of a plurality of features defined for the application, store data pertaining to the
feature as feature information
204
```
↓
```
For each of a plurality of services defined for the application, store data pertaining to the
service as service information
206
```
↓
```
Store data pertaining to dependencies among the features and services as dependency
information
208
```

```
Identify a new feature defined for an application comprising a plurality of layers
302
```
↓
```
Process, using a processor, data pertaining to layer information, service information,
feature information and dependency information for the application and, based on the
processing, identifying a highest layer of a plurality of layers of the application
containing at least one service or at least a second feature upon which the new feature is
dependent
304
```
↓
```
Render a recommendation to place the new feature in the highest layer of the plurality of
layers containing the at least one service or at least the second application feature upon
which the new application feature is dependent
306
```

```
┌─────────────────────────────────────────────────────────────────────────┐
│ Identify a present change in a service or feature dependency of a first │
│                            existing feature                              │
│                                   502                                    │
└─────────────────────────────────────────────────────────────────────────┘
                                    │
                                    ▼
┌─────────────────────────────────────────────────────────────────────────┐
│ Determine a highest layer of the plurality of layers of the application │
│ containing at least one service or at least a second feature upon which │
│               the first existing feature is newly dependent              │
│                                   504                                    │
└─────────────────────────────────────────────────────────────────────────┘
                                    │
                                    ▼
┌─────────────────────────────────────────────────────────────────────────┐
│ Determine whether a layer of the application in which the first existing │
│ feature presently is contained is lower than the highest layer of the    │
│ plurality of layers of the application containing the at least one       │
│ service or at least the second feature upon which the first existing     │
│                       feature is newly dependent                         │
│                                   506                                    │
└─────────────────────────────────────────────────────────────────────────┘
                                    │
                                    ▼
┌─────────────────────────────────────────────────────────────────────────┐
│ Responsive to determining that the layer of the application in which the │
│ first existing feature presently is contained is lower than the highest  │
│ layer of the plurality of layers of the application containing the at    │
│ least one service or at least the second feature upon which the first    │
│ existing feature is newly dependent, render a second recommendation to   │
│ place the first existing feature in the highest layer of the plurality   │
│ of layers of the application containing the at least one service or at   │
│ least the second feature upon which the first existing feature is newly  │
│                                 dependent                                │
│                                   508                                    │
└─────────────────────────────────────────────────────────────────────────┘
                                    │
                                    ▼
┌─────────────────────────────────────────────────────────────────────────┐
│  Determine whether at least a third feature is dependent on the first    │
│                            existing feature                              │
│                                   510                                    │
└─────────────────────────────────────────────────────────────────────────┘
                                    │
                                    ▼
                                  ( A )
```

Identify at least one existing feature for which an impact of removing the existing feature is desired to be identified
702

---

Determine whether one other feature that dependent on the identified existing feature
704

---

Responsive to determining one or more other features are dependent on the identified feature, identifying aspects of those features impacted by removal of the identified existing feature
706

---

Render a recommendation indicating the other features that are dependent on the identified existing feature and aspects of the other features impacted by removal of the of the existing feature
708

LOCATING FEATURES IN A LAYERED SOFTWARE APPLICATION

BACKGROUND

The present invention relates to software design tools, and more specifically, to software design tools for multi-layered applications.

A multi-layered application contains multiple layers of functionalities wherein each layer is dependent on, or is made dependent by, one or more other layers. A layer represents the orientation of different physical or conceptual elements of an application, and different layers are used to allocate various responsibilities of the application. In illustration, an application may include a presentation layer, a business layer, a persistence layer and a database layer. In some cases, the business layer and persistence layer may be combined into a single business layer, for example, when persistence logic is embedded within business layer components. An application also may include additional layers. Indeed, complex applications may include five or more layers.

SUMMARY

A method includes identifying layer information for each of a plurality of layers defined in an application, service information for each of a plurality of services defined in the application, feature information for each of a plurality of features defined in the application, and dependency information pertaining to dependencies among the plurality of services and features by automatically analyzing program code of the application, and storing data pertaining to the identified layer information, service information, feature information and dependency information to a functional data structure. The method also can include identifying a new feature defined for the application. The method also can include processing, using a processor, data pertaining to the layer information, the service information, the feature information and the dependency information for the application and, based on the processing, identifying a highest layer of the plurality of layers of the application containing at least one service or at least a second feature upon which the new feature is dependent. The method also can include rendering a recommendation to place the new feature in the highest layer of the plurality of layers containing the at least one service or at least the second feature upon which the new feature is dependent.

A system includes a processor programmed to initiate executable operations. The executable operations include identifying layer information for each of a plurality of layers defined in an application, service information for each of a plurality of services defined in the application, feature information for each of a plurality of features defined in the application, and dependency information pertaining to dependencies among the plurality of services and features by automatically analyzing program code of the application, and storing data pertaining to the identified layer information, service information, feature information and dependency information to a functional data structure. The executable operations also can include identifying a new feature defined for the application. The executable operations also can include processing data pertaining to the layer information, the service information, the feature information and the dependency information for the application and, based on the processing, identifying a highest layer of the plurality of layers of the application containing at least one service or at least a second feature upon which the new feature is dependent. The executable operations also can include rendering a recommendation to place the new feature in the highest layer of the plurality of layers containing the at least one service or at least the second feature upon which the new feature is dependent.

A computer program product comprising a computer readable storage medium having program code stored thereon, the program code executable by a processor to perform a method. The method includes identifying, by the processor, layer information for each of a plurality of layers defined in an application, service information for each of a plurality of services defined in the application, feature information for each of a plurality of features defined in the application, and dependency information pertaining to dependencies among the plurality of services and features by automatically analyzing program code of the application, and storing, by the processor, data pertaining to the identified layer information, service information, feature information and dependency information to a functional data structure. The method also can include identifying, by the processor, a new feature defined for the application. The method also can include processing, by the processor, data pertaining to the layer information, the service information, the feature information and the dependency information for the application and, based on the processing, identifying a highest layer of the plurality of layers of the application containing at least one service or at least a second feature upon which the new feature is dependent. The method also can include rendering, by the processor, a recommendation to place the new feature in the highest layer of the plurality of layers containing the at least one service or at least the second feature upon which the new feature is dependent.

DETAILED DESCRIPTION

The present invention relates to software design tools, and more specifically, to software design tools for multi-layered applications. In accordance with the inventive arrangements disclosed herein, a multi-layered application design tool is described. The multi-layered application design tool can provide recommendations on where to position various features of a multi-layered application and, more particularly, on which layer of the multi-layered application to locate the features. The multi-layered application design tool can provide the recommendations responsive to new features being added to the application or features and/or services being moved between layers of the application. Further, the multi-layered application design tool can provide a list of impacts and recommendations to a user responsive to features and/or services being considered for movement to new layers or features being considered for removal from the application.

Several definitions that apply throughout this document now will be presented.

As defined herein, the term "multi-layered application" means a software application comprising two or more layers arranged in a hierarchical manner.

As defined herein, the term "layer" means a logical grouping of reusable software components, such as features and services, in a layer hierarchy.

As defined herein, the term "feature" means is a unit of functionality of a software application that satisfies a requirement, represents a design decision and/or provides a potential configuration option.

As defined herein, the term "service" means an application component that provides services to other application components, such as other services and features, which are dependent on the application component. In illustration, a particular feature may be configured to gather certain information and present the information on a display. That particular feature may utilize a data service to access the information from a database and a rendering service to render the information on the display. Because the feature uses the data service and the rendering service to implement its functionality, the feature is considered to be dependent on the data service and rendering service.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 1:
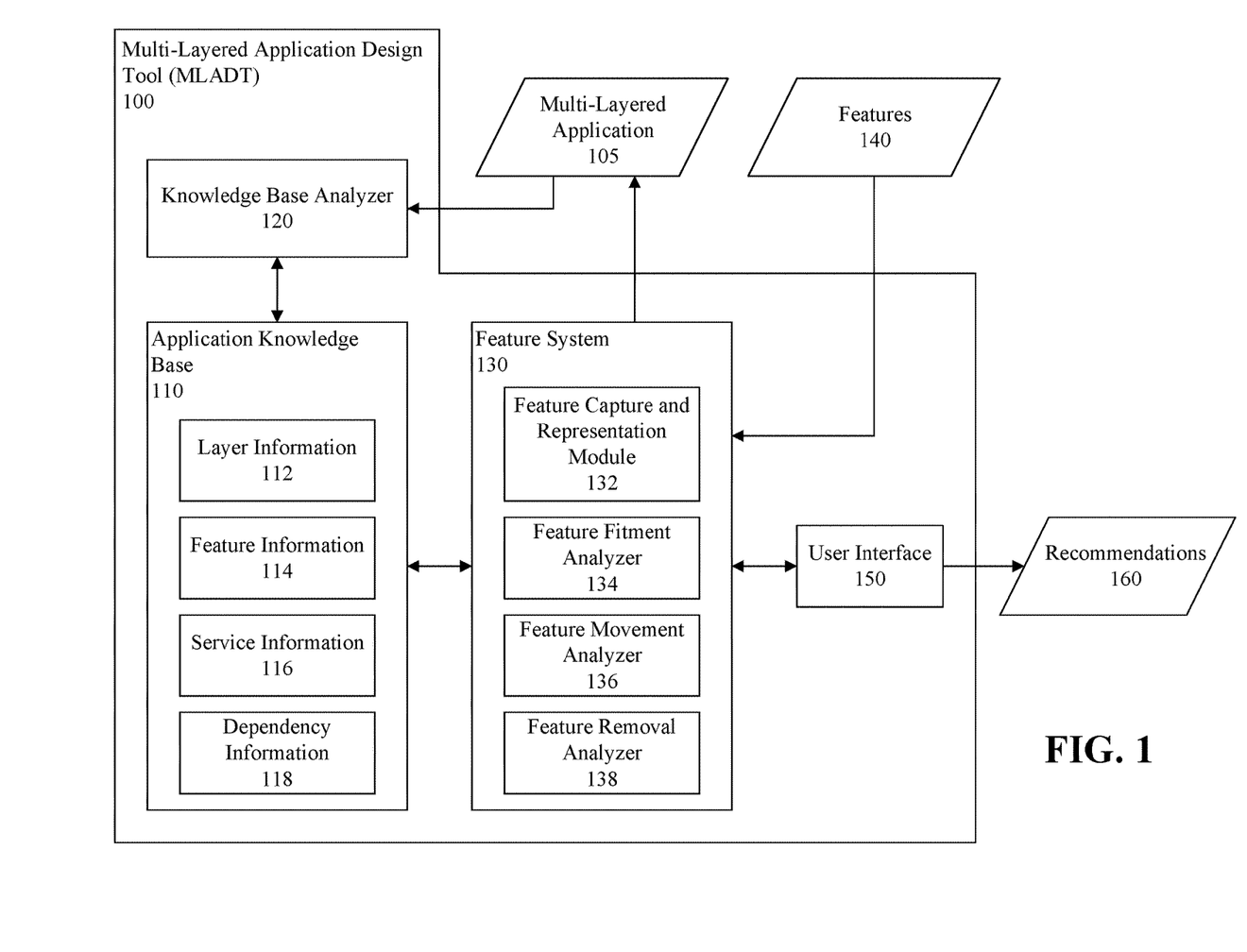
FIG. 1 is a block diagram illustrating an example of a multi-layered application design tool.

FIG. 1 is a block diagram illustrating an example of a multi-layered application design tool (MLADT) 100 configured to facilitate design of a multi-layered software application (hereinafter "application") 105. The MLADT 100 can include an application knowledge base 110. The application knowledge base 110 can be implemented as a database or as another suitable data structure. The application knowledge base 110 can contain architectural details of at least one multi-layered application (hereinafter "application"). The application knowledge base 110 can include, for example, layer information 112, feature information 114, service information 116 and dependency information 118. The layer information 112, feature information 114, service information 116 and dependency information 118 can be stored in one or more functional data structures, for example data tables in the database or other suitable data structures.

The layer information 112 can include data (e.g., metadata) identifying each layer defined for the application 105. Such data also can indicate a position of each of the layers in a layer hierarchy. For example, the data can indicate a sequential layer number or letter assigned to each layer. For the present description, it will be assumed that the lowest layer in the layer hierarchy is assigned an identifier "L1," the next lowest layer in the layer hierarchy is assigned an identifier "L2," and so on. Those of ordinary skill in the art will appreciate, however, that the layers can be identified in any other suitable manner and the present arrangements are not limited in this regard.

The feature information 114 can include data (e.g., metadata) identifying each feature defined for the application 105. The data can indicate to which layer each respective feature is assigned. The data also can indicate types of data used by various aspects of each feature. Further, the data also can indicate any of a myriad of other information about each feature, such as feature names and other details about the features.

The service information 116 can include data (e.g., metadata) identifying each of a plurality of services defined for the application 105. Further, the data can indicate to which layer each respective service is assigned. The data also can indicate any of a myriad of other information about each service, such as service names and other details about the services.

The dependency information 118 can include data (e.g., metadata) identifying dependencies among services and features. In illustration, the dependency information 118 can indicate which services depend on other services, and which services upon which they depend. The dependency information 118 also can indicate which features depend on (e.g., use) services, and which services upon which they depend. Further, the dependency information 118 can indicate which features depend on other features, and which features upon which they depend. In addition, the dependency information 118 can indicate the type of data being exchanged between each service and services/features that depend on the service, as well as the type of data being exchanged between each feature and other features that depend on the feature.

The layer information 112, feature information 114, service information 116 and dependency information 118 can be learned by the MLADT 100, and the MLADT 100 can educate the application knowledge base 110 with the layer information 112, feature information 114, service information 116 and dependency information 118 based on such learning. In illustration, the MLADT 100 can include a knowledge base analyzer 120, which can analyze program code for the application 105 to determine the layer information 112, feature information 114, service information 116 and dependency information 118.

Figure 2:
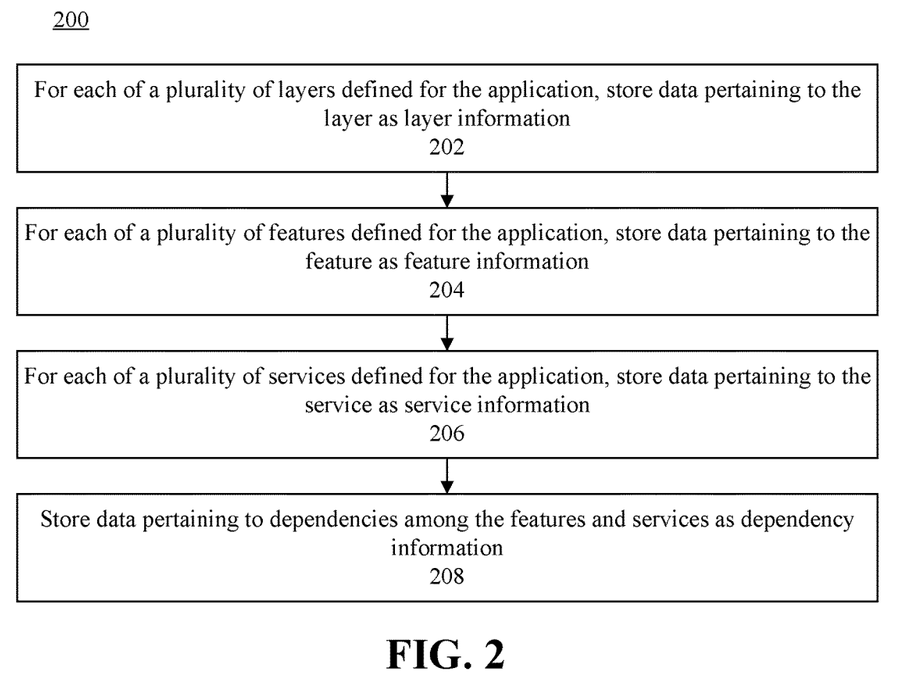
FIG. 2 is a flow chart illustrating an example of a method of educating an application knowledge base with data pertaining to a multi-layered application.

FIG. 2 is a flow chart illustrating an example of a method 200 of educating the application knowledge base 110 with data pertaining to a multi-layered application. The method 200 can be performed by the knowledge base analyzer 120.

At step 202, for each of a plurality of layers defined for the application, data pertaining to the layer can be stored in the application knowledge base 110 as layer information 112. In one arrangement, the layer information 112 for each layer can be entered into the application knowledge base 110 by a user of the MLADT tool 100. In another arrangement, the knowledge base analyzer 120 can access program code for the application 105 and analyze the program code to identify each of a plurality of layers defined for the application 105. For instance, the knowledge base analyzer 120 can search the program code for program code and comments/metadata pertaining to layer information. For each layer, the knowledge base analyzer 120 can store data pertaining to the layer as layer information 112.

The layer information 112 for each layer can include, for example, a layer identifier that identifies the layer. The layer information 112 for each layer also can indicate where in a layer hierarchy the layer is located. In a simple example, the location can be indicated by the layer identifier, though this need not be the case. For instance, a layer identifier "L1" assigned to a first layer can indicate that the first layer is the lowest layer in the layer hierarchy, a layer identifier "L2" assigned to a second layer can indicate that the second layer is immediately above the first layer, and so on.

At step 204, for each of a plurality of features defined for the application, data pertaining to the feature can be stored in the application knowledge base 110 as feature information 114. In one arrangement, the feature information 114 for each feature can be entered into the application knowledge base 110 by a user of the MLADT tool 100. In another arrangement, the knowledge base analyzer 120 can analyze the program code to identify each of a plurality of features defined for the application. For instance, the knowledge base analyzer 120 can search the program code for program code and comments/metadata pertaining to features. For each feature, the knowledge base analyzer 120 can store data pertaining to the feature as feature information 114.

The feature information for each feature can include a feature identifier that identifies the feature, a description that describes the feature and a layer identifier that indicates which layer the feature is assigned. The feature information 114 also can include, for each feature, data indicating one or more other services and/or features upon which the feature is dependent. Further, the feature information can include, for each feature, information indicating in which release (e.g., version) of the application 105 the feature was introduced. If customer usage information is available to the knowledge base analyzer 120, the knowledge base analyzer 120 can include, for one or more features, information indicating which customers use the feature(s). Still, the feature information 114 can include a myriad of other data and the present arrangements are not limited in this regard.

At step 206, for each of a plurality of services defined for the application, data pertaining to the service can be stored in the application knowledge base 110 as service information 116. In one arrangement, the service information 116 for each service can be into the application knowledge base 110 by a user of the MLADT tool 100. In another arrangement, the knowledge base analyzer 120 can analyze the program code to identify each of a plurality of services defined for the application. For instance, the knowledge base analyzer 120 can search the program code for program code and comments/metadata pertaining to services. For each service, the knowledge base analyzer 120 can store data pertaining to the service as service information 116.

The service information 116 for each service can include a service identifier that identifies the service, a description that describes the service and a layer identifier that indicates which layer the service is assigned. The service information 116 also can include data indicating one or more other services upon which the service is dependent, if any. Still, the service information 116 can include a myriad of other data and the present arrangements are not limited in this regard.

At step 208, data pertaining to dependencies among the features and services can be stored in the application knowledge base 110 as dependency information 118. In one arrangement, the dependency information 118 can be entered into the application knowledge base 110 by a user of the MLADT tool 100. In another arrangement, the knowledge base analyzer 120 can analyze the program code to identify dependencies among the features and services, and store data pertaining to the dependencies as dependency information 118. For instance, the knowledge base analyzer 120 can, for each identified service and feature, search for the program code for program code and comments/metadata pertaining to dependency on other services and/or features.

The dependency information 118 for each service can indicate not only which other services the service is dependent, but also other services that depend on the service. The dependency information 118 for each feature can indicate not only which services and/or other features the feature is dependent, but also other features that depend on the feature. Further, the dependency information 118 for services and features can indicate inner dependencies among services and features in each layer, as well as outer dependences between services and features in different layers. At this point, it should be noted that step 210 need not be performed sequentially after steps 206, 208, but can be performed while steps 206 and 208 are performed. Thus, as services and features are identified in the program code, the knowledge base analyzer 120 can create the dependency information 118.

During the development and lifecycle of an application, the architecture of the application typically will evolve. For example, new features and services may be added to the application 105, features and services may be removed from the application 105, and existing features and services may change. Nonetheless, the knowledge base analyzer 120 can monitor such additions and/or changes and, responsive to detecting additions and/or changes, perform the above processes to update the application knowledge base 110.

Referring again to FIG. 1, the MLADT 100 also can include a feature system 130. The feature system 130 can include a feature capture and representation module 132, a feature fitment analyzer 134, a feature movement analyzer 136 and a feature removal analyzer 138.

The feature capture and representation module 132 can capture information for new features defined for the application 105. In addition to computer program code to implement a feature, a feature also may include various other data (e.g., metadata), such as a description of the feature, services information, dependency features, the release (e.g., version) of the application in which the feature is incorporated, and a list of customers using the feature. The services information can include information indicating one or more services used by the new feature and the layers to which the services are assigned. The dependency features can include a list of other features having outward dependencies with the feature and inward dependencies of those other features.

The feature capture and representation module 132 can present one or more interactive screens on a display via a user interface 150. Via the interactive screen(s), a user can identify a new feature 140 to be incorporated into the application 105. For example, via the interactive screen(s), the user can enter computer program code and/or metadata for the new feature 140 or create a link to the computer program code and/or metadata for the new feature 140. The metadata can include information related to the feature 140, for example a name or identifier assigned to the feature 140, a description of the feature 140, a number of services upon which the feature 140 is dependent, and layering information 112 related to the feature 140, such as a layer to which the feature 140 is initially assigned. Further, via the interactive screen(s), the user can enter the various other data for the new feature 140. Optionally, in lieu of entering the services information and dependency features, the user can initiate the feature fitment analyzer 134 to determine the services information and dependency features.

Figure 3:
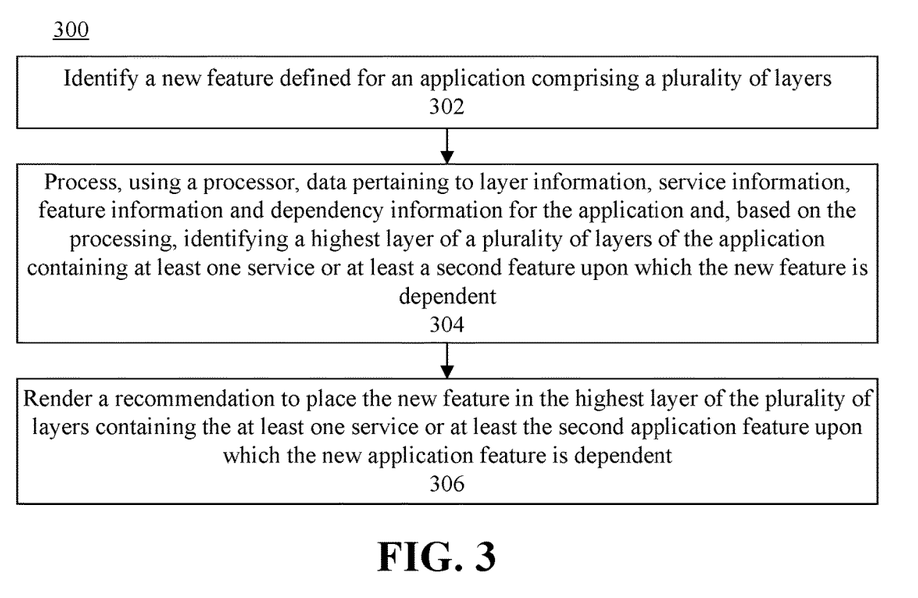
FIG. 3 is a flow chart illustrating an example of a method of determining in which layer of a multi-layered application a feature should be located.

FIG. 3 is a flow chart illustrating an example of a method 300 of determining in which layer of a multi-layered application a feature 140 should be located. The method 300 can be implemented by the feature fitment analyzer 134.

At step 302, the feature fitment analyzer 134 can identify a new feature defined for an application 105 comprising a plurality of layers, which in this example is feature 140. In addition, the feature fitment analyzer 134 can identify a position of the feature 140 in the application 105, for example a layer to which the feature 140 is initially assigned. At step 304, the feature fitment analyzer 134 can process, using a processor, data pertaining to layer information 112, feature information 114, service information 116 and dependency information 118 for the application 105 and, based on the processing, identify a highest layer of a plurality of layers of the application 105 containing at least one service or at least a second feature upon which the new feature 140 is dependent. The service information 116 can include information pertaining to one or more services upon which the new feature 140 may be dependent (e.g., services used by the new feature 140), the layer information 112 can include information pertaining to one or more layers upon which the new feature 140 may be dependent, and the dependency information 118 can include information pertaining to dependencies among various services and/or features.

In one arrangement, the feature fitment analyzer 134 can identify the services and/or other features upon which the new feature 140 is dependent based on information entered for the new feature 140 by a user using the feature capture and representation module 132. In another arrangement, the feature fitment analyzer 134 can analyze the computer program code for the new feature 140 to identify the services and/or other features upon which the new feature 140 is dependent. Further, the feature fitment analyzer 134 can access from the application knowledge base 110 and analyze the layer information 112, feature information 114, service information 116 and dependency information 118 relating to the application. Based on the analyzing the computer program code for the new feature 140 and the information from the application knowledge base 110, the feature fitment analyzer 134 can determine all dependencies pertaining to new feature, including serial dependencies from the new feature 140 through a string of other services and/or features. The feature fitment analyzer 134 can automatically update the feature information for the new feature 140 with the determined services information and dependency features. Based on the above information, the feature fitment analyzer 134 can determine a highest layer containing a service or other feature upon which the new feature 140 is dependent.

Figure 4:
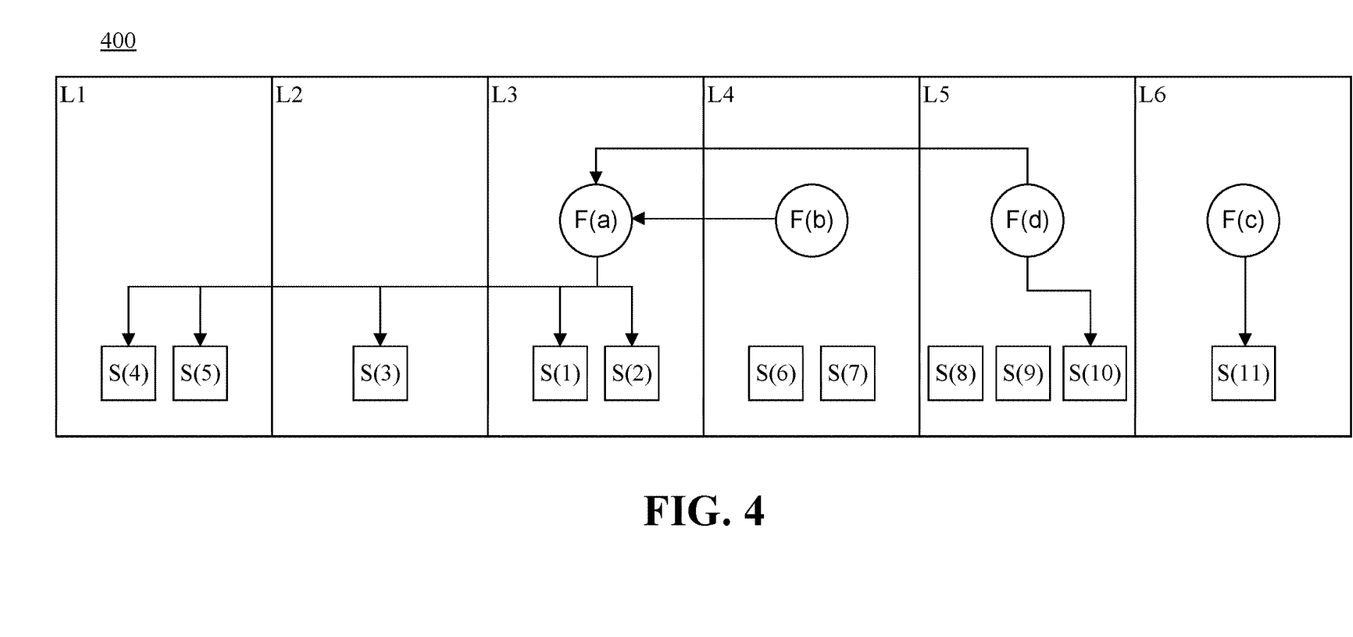
FIG. 4 is a layer diagram illustrating various layers of a multi-layered application.

By way of example, reference is now made to FIG. 4, which is a layer diagram 400 illustrating various layers of a multi-layered application, such as the application 105. In this example, assume the application 105 includes layers L1, L2, L3, L4, L5 and L6. Also assume that layer L1 contains services S(4), S(5), layer L2 contains service S(3), layer L3 contains services S(1), S(2), layer L4 contains services S(6), S(7), layer L5 contains services S(8), S(9), S(10), and layer L6 contains service S(11). Further, feature F(a) depends on services S(4), S(5), service S(3), and services S(1), S(2), feature F(b) depends on feature F(a), and feature F(c) depends on service S(11). Now, assume the new feature 140 is feature F(d), and the dependency feature of F(d) indicates that feature F(d) depends on service S(10) and feature F(a). By analyzing the various information 112-118 contained in the application knowledge base 110, the feature fitment analyzer 134 can determine that feature F(a) is contained in layer L3 and service S(10) is contained in layer L5. Accordingly, the feature fitment analyzer 134 can determine that layer L5 is the highest layer containing a service or other feature upon which feature F(d) is dependent.

At step 306, the feature fitment analyzer 134 can, using the user interface 150, render a recommendation 160 to place the new feature 140 in the highest layer of the plurality of layers containing the at least one service or at least the second application feature upon which the new application feature 140 is dependent. In illustration, the feature fitment analyzer 134 can generate a recommendation 160 to place the feature F(d) in the highest layer containing a service or other feature upon which the new feature is dependent, which is layer L(5). The feature fitment analyzer 134 can communicate the recommendation 160 to the user interface 150, which can render the recommendation 160 to the user. For example, the user interface 150 can render the recommendation in a screen presented on the display by the feature capture and representation module 132. In other arrangements, the feature fitment analyzer 134 can output the recommendation 160 to a data table, file or the like, or send the recommendation 160 to a printer. In one arrangement, as at least part of the recommendation 160, the feature fitment analyzer 134 can output the a layer diagram showing where to place the feature F(d), for example as depicted in FIG. 4. The layer diagram can show the various features and services of the application 105, as well as their dependencies and recommended locations.

As noted, during the development and lifecycle of the application 105, the architecture of the application 105 may evolve. For example, the dependencies of features and services may change. In this regard, referring again to FIG. 1, a user may use the feature capture and representation module 132 to change services information for one or more services and/or dependency features for one or more features and/or services. Nonetheless, the present arrangements also include processes to address such changes.

Figure 5A:
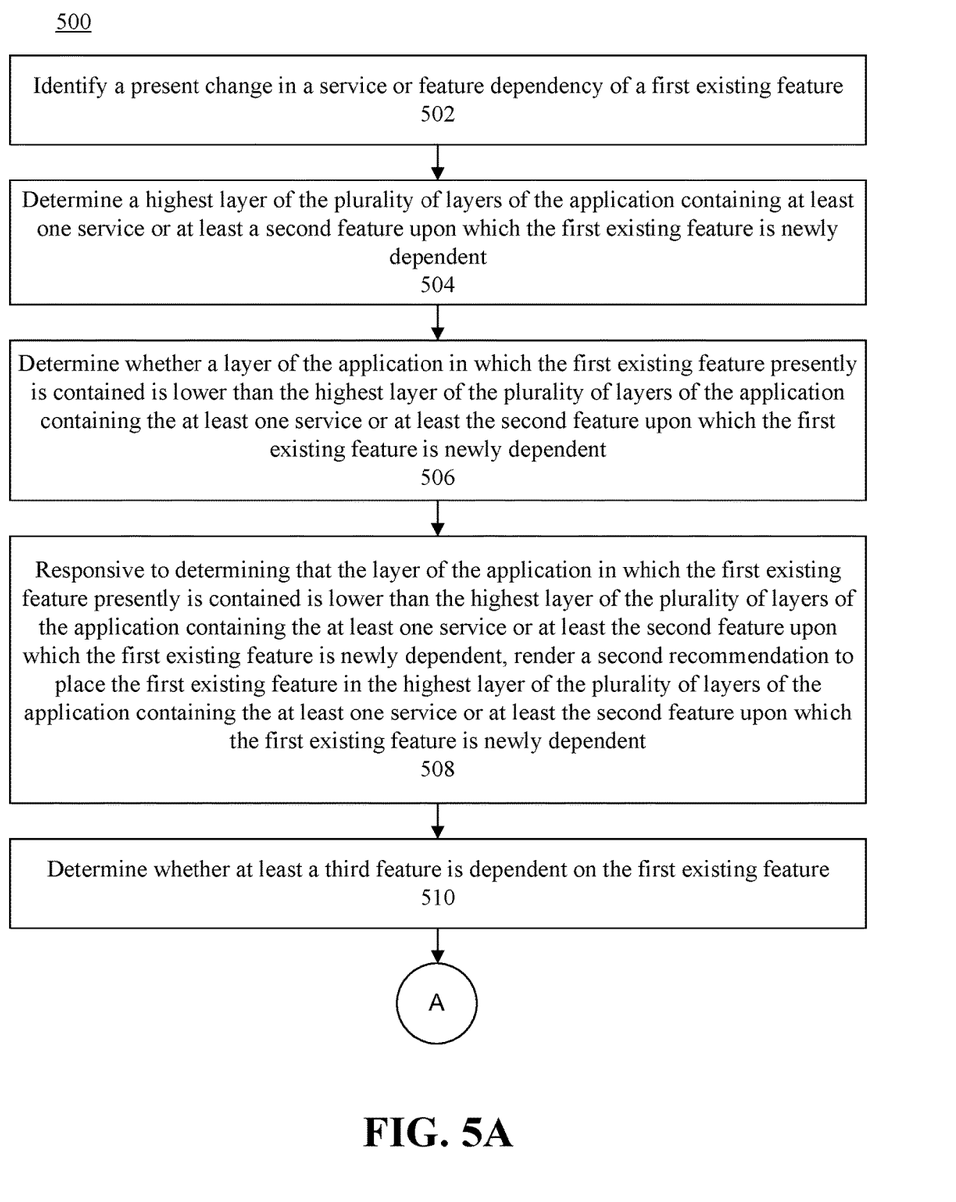
FIGS. 5A and 5B are a flow chart illustrating an example of a method of determining to which layer of a multi-layered application a feature should be moved in response to changing service or feature dependencies.
Figure 5B:
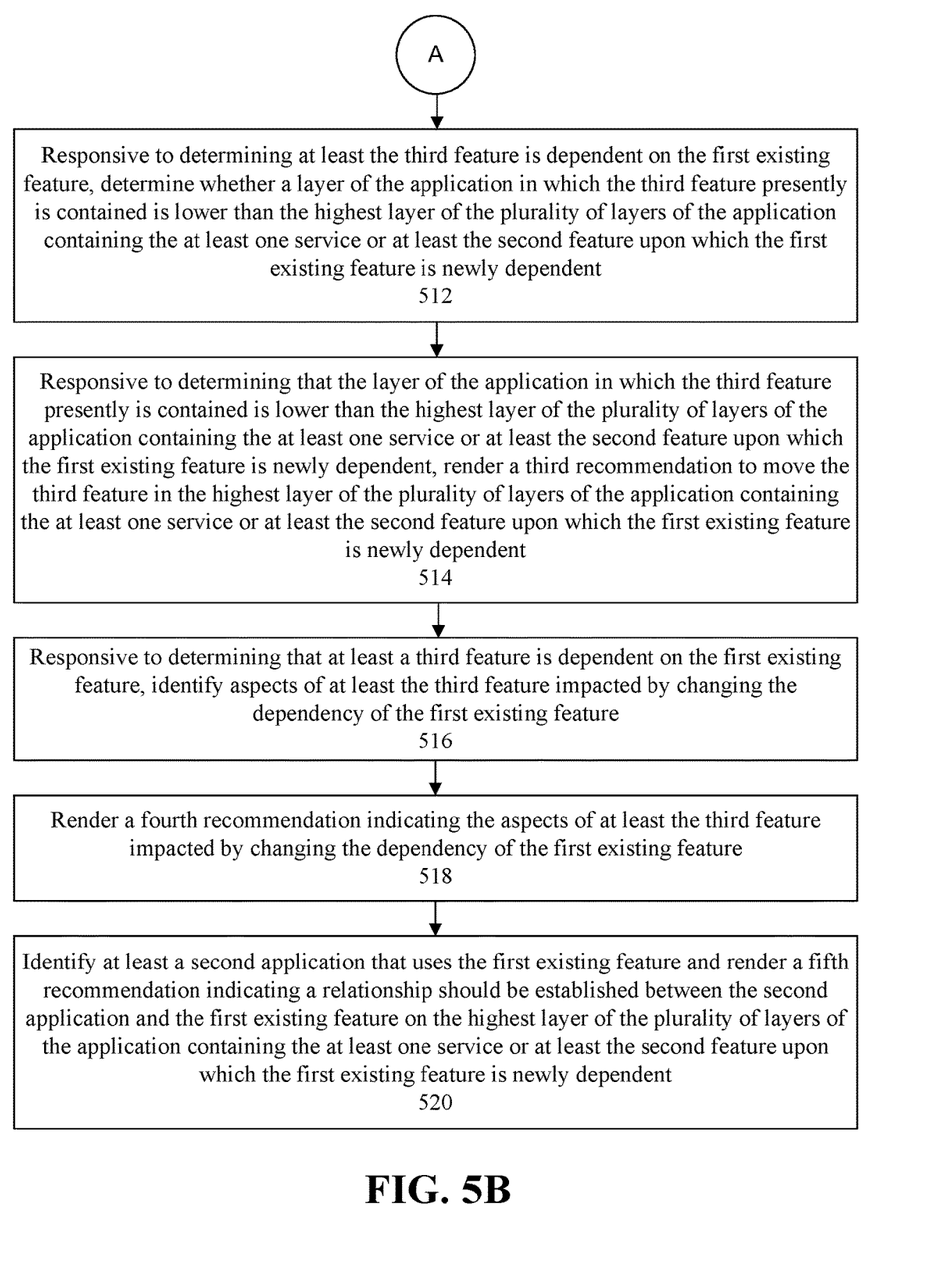

FIG. 5 is a flow chart illustrating an example of a method 500 of determining to which layer of a multi-layered application a feature should be moved in response to changing service or feature dependencies. The method 500 can be implemented by the feature movement analyzer 136, and can be initiated responsive to a user changing services information for one or more services and/or dependency features for one or more features and/or services using a menu presented by the feature capture and representation module 132 via the user interface 150.

At step 502, the feature movement analyzer 136 can identify a present change in a service or feature dependency of a first existing feature, which in this example is feature 140. By way of example, reference is now made to FIG. 6, which is another layer diagram illustrating various layers of a multi-layered application, such as the application 105. In this example, assume that the feature 140 represents the first existing feature, which is feature F(a), and that dependencies for feature F(a) have changed. Specifically, referring to FIGS. 4 and 6, the dependencies of feature F(a) on services S(4), S(2) have been removed, and new dependencies of feature F(a) have been added to make feature F(a) additionally dependent on services S(6), S(9). In another example (not shown) a user may change the layer(s) to which one or more services are assigned. For example, the user may move service S(2) from layer L3 to layer L5.

In one arrangement, the feature movement analyzer 136 can identify the changes based on changes to the services information and dependency features made by a user via the feature capture and representation module 132. In another arrangement, the feature movement analyzer 136 can identify the changes by analyzing the computer program code for the first existing feature 140 to identify services and/or other features upon which the first existing feature 140 now depends. Further, the feature movement analyzer 136 can access from the application knowledge base 110 and analyze the layer information 112, feature information 114, service information 116 and dependency information 118 relating to the identified services and/or other features. Based on the analyzing the computer program code for the first existing feature 140 and the information from the application knowledge base 110, the feature movement analyzer 136 can determine the services information and dependency features. The feature movement analyzer 136 can automatically update the feature information for the first existing feature 140 with the determined services information and dependency features.

At step 504, the feature movement analyzer 136 can determine a highest layer of the plurality of layers of the application 105 containing at least one service or at least a second feature upon which the first existing feature 140 is newly dependent. For example, the feature movement analyzer 136 can access and process the dependency information 118 to determine which services and/or other features the first existing feature 140 is dependent. Further, the feature movement analyzer 136 can access and process the layer information 112, feature information 114 and/or service information 116 to determine on which layers the first existing feature 140, and the services and/or other features upon which the first existing feature 140 depends, are located. In this example, the feature movement analyzer 136 can determine that of the services S(5), S(3), S(1), S(6), S(9) upon which the feature F(a) depends, service S(9) is contained in the highest of layers containing the services S(5), S(3), S(1), S(6), S(9). In this example, service S(9) is contained in layer L5. In the other mentioned example (not shown), service S(2) may have been moved from layer L3 to layer L5, and thus is contained in the highest of layers containing the services S(5), S(3), S(2), S(6).

At step 506, the feature movement analyzer 136 can determine whether a layer of the application 105 in which the first existing feature 140 presently is contained is lower than the highest layer of the plurality of layers of the application 105 containing the at least one service or at least the second feature upon which the first existing feature 140 is newly dependent. In the present example, feature F(a) has not yet been moved, and is located in layer L(3) as shown in FIG. 4. Thus, the feature movement analyzer 136 can determine whether layer L3 containing feature F(a) is lower than layer L5 containing service S(9), as shown in FIG. 4.

At step 508, the feature movement analyzer 136 can, responsive to determining that the layer of the application 105 in which the first existing feature 140 presently is contained is lower than the highest layer of the plurality of layers of the application 105 containing the at least one service or at least the second feature upon which the first existing feature is newly dependent, render a second recommendation 160 to place the first existing feature 140 in the highest layer of the plurality of layers of the application containing the at least one service or at least the second feature upon which the first existing feature is newly dependent. In this example, since service S(9) is contained in layer L5, the feature movement analyzer 136 can, using the user interface 150, render a recommendation to move feature F(a) to layer L5, as shown in FIG. 6.

Figure 6:
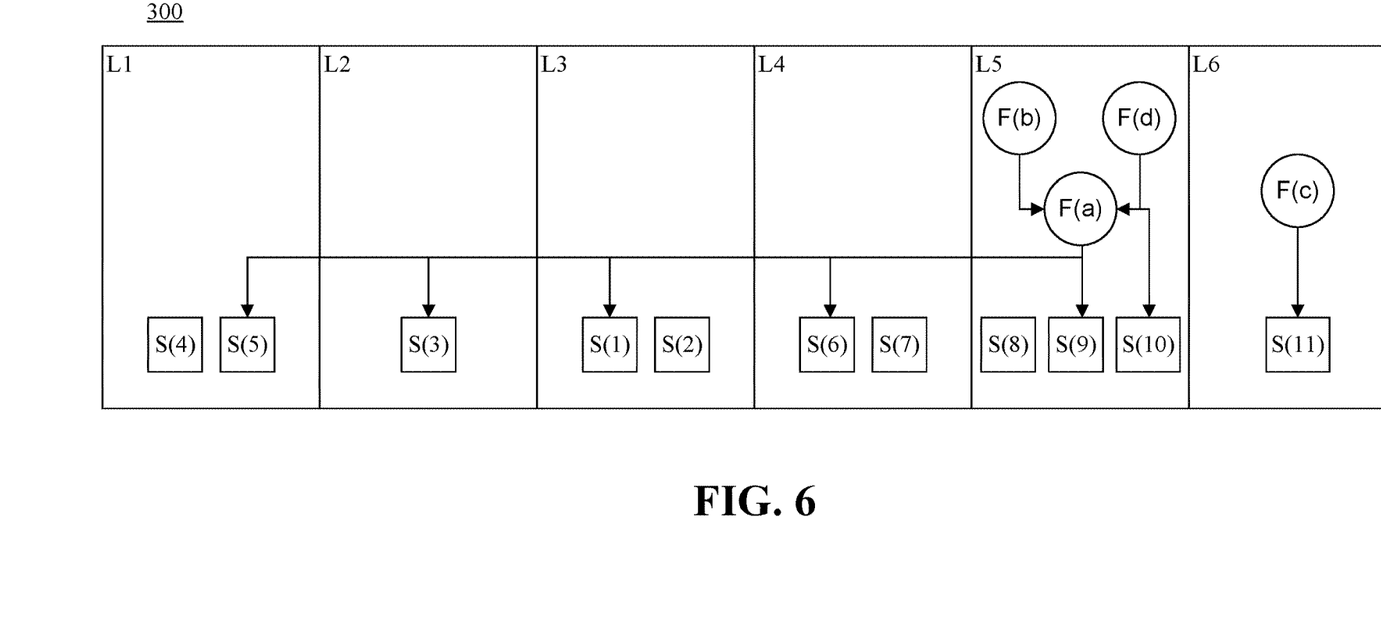
FIG. 6 is another layer diagram illustrating various layers of a multi-layered application.

In one arrangement, as at least part of the recommendation 160, the feature fitment analyzer 134 can output a layer diagram showing where to place the features F(a), F(b), for example as depicted in FIG. 6. Again, the layer diagram can show the various features and services of the application 105, as well as their dependencies and recommended locations. In one arrangement, the layer diagram can show the current location(s) and recommended location(s) of features to be moved. For instance, the layer diagram can show the current locations of feature F(a) on layer L3 and feature F(b) on layer L4 with solid lines representing the features F(a), F(b), and show the features F(a), F(b) on layer L5 with dashed lines representing those features, thus indicating their recommended locations.

Other features may be dependent on feature F(a), and the feature movement analyzer 136 can provide recommendations for such other features. Thus, at step 510, the feature movement analyzer 136 can determine whether at least a third feature is dependent on the first existing feature 140. For instance, the feature movement analyzer 136 can access and process the dependency information 118 to determine whether one or more other features are dependent on the first existing feature 140. Referring to FIG. 4, in the present example, the feature movement analyzer 136 can determine that features F(b), F(d) depend on feature F(a).

At step 512, responsive to determining at least the third feature is dependent on the first existing feature 140, the feature movement analyzer 136 can determine whether a layer of the application 105 in which the third feature presently is contained is lower than the highest layer of the plurality of layers of the application 105 containing the at least one service or at least the second feature upon which the first existing feature is newly dependent. The feature movement analyzer 136 can access and process the layer information 112 and/or feature information 114 to determine on which layers the other feature(s) that depend on the first existing feature 140 are located. Referring to FIG. 4, in this example, the feature movement analyzer 136 can determine that feature F(b) is contained on layer L4, which is lower than layer L5 containing service S(9).

At step 514, responsive to determining that the layer of the application 105 in which the third feature presently is contained is lower than the highest layer of the plurality of layers of the application containing the at least one service or at least the second feature upon which the first existing feature 140 is newly dependent, the feature movement analyzer 136 can render a third recommendation 160 to move the third feature in the highest layer of the plurality of layers of the application 105 containing the at least one service or at least the second feature upon which the first existing feature 140 is newly dependent. In this example, the feature movement analyzer 136 can recommend to move feature F(b) to layer L5.

In addition to, or in lieu of, the previously discussed recommendations, responsive to determining that at least a third feature is dependent on the first existing feature 140, the feature movement analyzer 136 can identify aspects of at least the third feature impacted by changing the dependency of the first existing feature 140. For example, the dependency information 118 can indicate types of data exchanged between the first existing feature being changed and other features dependent upon that feature, and the feature information 114 can indicate various aspects of each feature that use data exchanged with other features. Thus, the feature movement analyzer 136 can access and process the feature information 114 and dependency information 118 to identify the various aspects of features that are dependent on data exchanged with the feature for which the dependency is being changed.

At step 518, the feature movement analyzer 136 can render another recommendation 160 indicating the aspects of at least the third feature impacted by changing the dependency of the first existing feature 140. In illustration, the feature movement analyzer 136 can render a recommendation 160 indicating other features (e.g., features F(b), F(d)) that are dependent on the first existing feature 140 (e.g., feature F(a)), the type of information exchanged between the other features and the feature 140 for which the dependency is being changed, and the aspects of the other features that would be impacted by the change.

In some cases, another product may use features and/or services provided by the application 105. For example, a second application may use the first existing feature 140. If so, at step 520 the feature movement analyzer 136 can identify the second application that uses the first existing feature 140. Further, the feature movement analyzer 136 can render a fifth recommendation indicating a relationship should be established between the second application and the first existing feature on the highest layer of the plurality of layers of the application containing the at least one service or at least the second feature upon which the first existing feature is newly dependent.

In some instances, a user may desire to remove one or more features from the application 105. In this regard, referring again to FIG. 1, a user may use the feature capture and representation module 132 to initiate analysis of the impact of removing at least one feature from the application 105.

Figure 7:
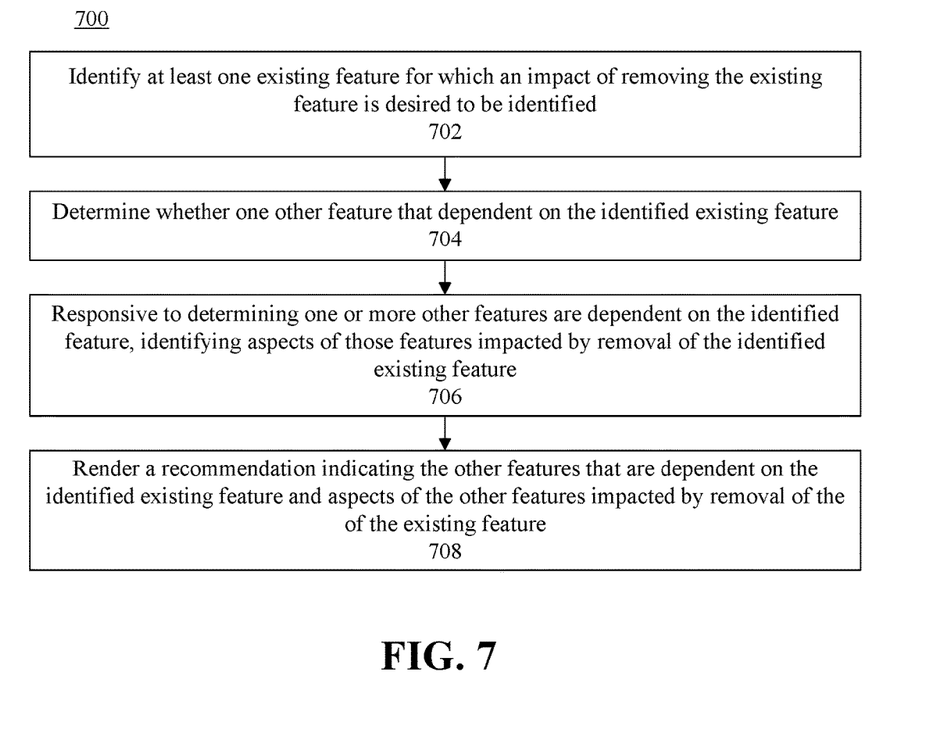
FIG. 7 is a flow chart illustrating an example of a method of determining an impact of removing a feature or service from an application.

FIG. 7 is a flow chart illustrating an example of a method 700 of determining an impact of removing a feature from an application. At step 702, the feature removal analyzer 138 can identify at least one existing feature for which an impact of removing the existing feature is desired. For example, referring to FIGS. 1 and 4, a user can select the feature F(a) in a screen presented by the feature capture and representation module 132 and select a menu item to view the impact of removing that feature. In response, the feature capture and representation module 132 can initiate the feature removal analyzer 138, indicating the identified existing feature.

At step 704, the feature removal analyzer 138 can determine whether one or more other features are dependent on the identified existing feature. For example, the feature removal analyzer 138 can analyze the feature information 114 and the dependency information 118 to determine whether one or more other features are dependent on the identified existing feature being considered for removal.

At step 706, responsive to determining one or more other features are dependent on the identified existing feature, the feature removal analyzer 138 can identify the other feature (s) and aspects of those features impacted by removal of the identified existing feature. For example, the dependency information 118 can indicate types of data exchanged between the feature being considered for removal and other features dependent upon that feature, and the feature information 114 can indicate various aspects of each feature that use data exchanged with other features. Thus, the feature removal analyzer 138 can identify the various aspects of features that are dependent on data exchanged with the identified existing feature being considered for removal, including types of information exchanged between the identified existing feature and the other features impacted by removal of the identified existing feature.

At step 708, the feature removal analyzer 138 can generate a recommendation 160 indicating other features that are dependent on the identified existing feature being considered for removal and aspects of the other features impacted by removal of the of the existing feature. Further, the recommendation 160 can indicate the type of information exchanged between the other features and the feature being considered for removal, and the aspects of the other features that would be impacted by removal of the feature. The feature removal analyzer 138 can communicate the recommendation 160 to the user interface 150, which can render the recommendation 160 to the user.

Figure 8:
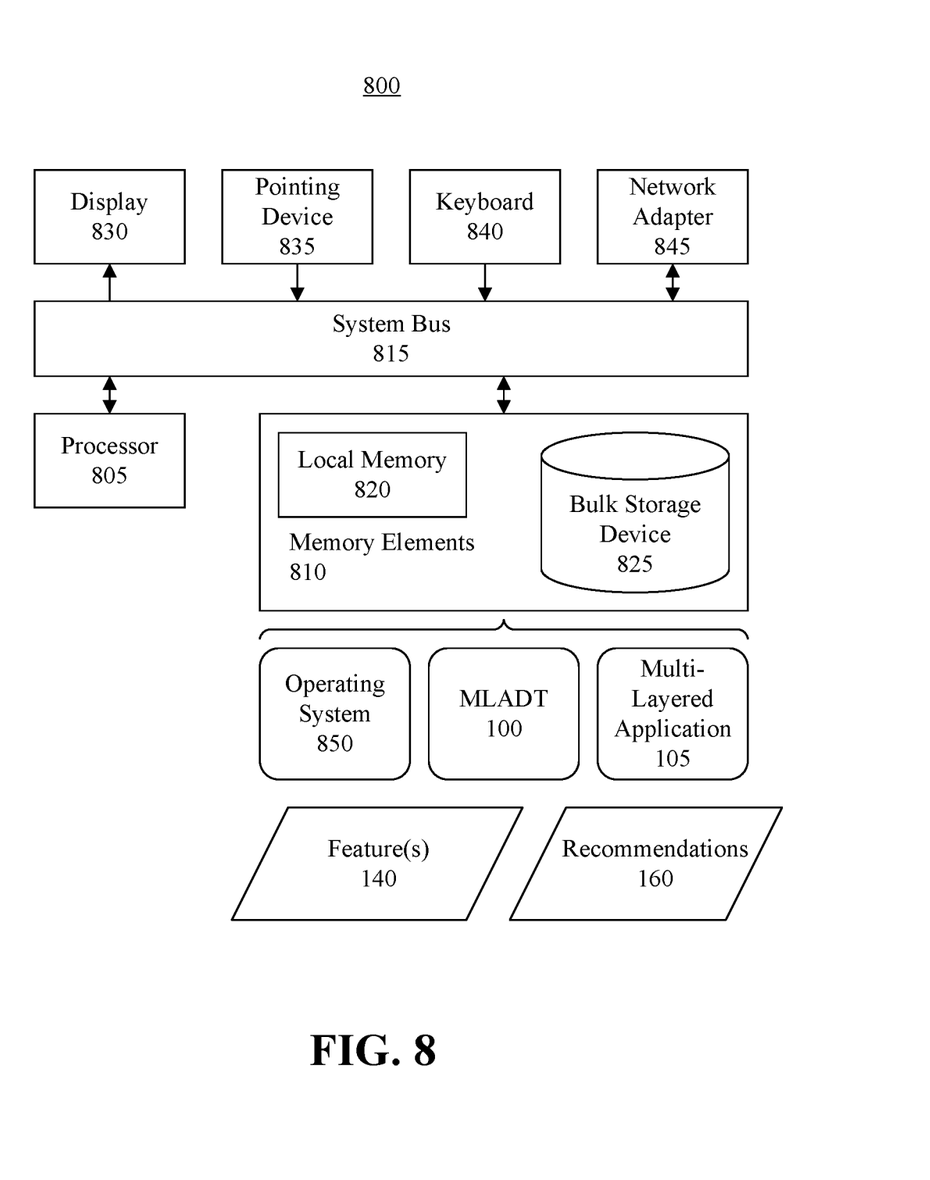
FIG. 8 is a block diagram illustrating example architecture for a data processing system.

FIG. 8 is a block diagram illustrating example architecture for a data processing system 800. The data processing system 800 can include at least one processor 805 (e.g., a central processing unit) coupled to memory elements 810 through a system bus 815 or other suitable circuitry. As such, the data processing system 800 can store program code within the memory elements 810. The processor 805 can execute the program code accessed from the memory elements 810 via the system bus 815. It should be appreciated that the data processing system 800 can be implemented in the form of any system including a processor and memory that is capable of performing the functions and/or operations described within this specification. For example, the data processing system 800 can be implemented as a server, a plurality of communicatively linked servers, a workstation, a desktop computer, a mobile computer, a tablet computer, a laptop computer, a netbook computer, a smart phone, a personal digital assistant, a set-top box, a network appliance, and so on.

The memory elements 810 can include one or more physical memory devices such as, for example, local memory 820 and one or more bulk storage devices 825. Local memory 820 refers to random access memory (RAM) or other non-persistent memory device(s) generally used during actual execution of the program code. The bulk storage device(s) 825 can be implemented as a hard disk drive (HDD), solid state drive (SSD), or other persistent data storage device. The data processing system 800 also can include one or more cache memories (not shown) that provide temporary storage of at least some program code in order to reduce the number of times program code must be retrieved from the bulk storage device 825 during execution.

Input/output (I/O) devices such as a display 830, a pointing device 835 and a keyboard 840 can be coupled to the data processing system 800. The I/O devices can be coupled to the data processing system 800 either directly or through intervening I/O controllers. For example, the display 830 can be coupled to the data processing system 800 via a graphics processing unit (GPU), which may be a component of the processor 805 or a discrete device. One or more network adapters 845 also can be coupled to data processing system 800 to enable the data processing system 800 to become coupled to other systems, computer systems, remote printers, and/or remote storage devices through intervening private or public networks. Modems, cable modems, transceivers, and Ethernet cards are examples of different types of network adapters 845 that can be used with the data processing system 800.

As pictured in FIG. 8, the memory elements 810 can store the components of the data processing system 800, namely an operating system 850 and the knowledge base analyzer 120, feature system 130 and user interface 150 of the MLADT 100. Being implemented in the form of executable program code, these components of the operating system 850 and the MLADT 100 can be executed by the data processing system 800 and, as such, can be considered part of the data processing system 800. The memory elements 810 also can store, at least temporarily, the application knowledge base 110 and the multi-layered application 105, including various features 140 and services of the multi-layered application 105. The data processing system 800 can persist the application knowledge base 110, multi-layered application 105 and/or features 140 to the bulk storage device 825, or access the application knowledge base 110, multi-layered application 105 and/or features 140 from one or more computer-readable storage mediums and/or other systems to which the data processing system 800 is communicatively linked via one or more networks, for example using the network adapter 845. Moreover, the components of the MLADT 100, including the application knowledge base 110, the knowledge base analyzer 120, the feature system 130 and the user interface 150, as well as the multi-layered application 105 and its features 140 and services, are functional data structures that impart functionality when employed as part of the data processing system 800.

Each of recommendation 160 generated by the MLADT 100 can be output to, and stored within, memory elements 810. As used herein, "outputting" and/or "output" can mean storing in memory elements 810, for example, writing to a file stored in memory elements 810. Further, each recommendation 160 generated by the MLADT 100 can be rendered by the data processing system 800. As used herein, the term "render" means writing to the display 830 or other peripheral output device, printing, playing audible notifications, sending or transmitting to another system, exporting, or similar operations.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

identifying layer information for each of a plurality of layers defined in an application, service information for each of a plurality of services defined in the application, feature information for each of a plurality of features defined in the application, and dependency information pertaining to dependencies among the plurality of services and features by automatically analyzing program code of the application, and storing data pertaining to the identified layer information, service information, feature information and dependency information to a functional data structure;

identifying a new feature defined for the application;
processing, using a processor, data pertaining to the layer information, the service information, the feature information, the dependency information for the application and, based on the processing, identifying a highest layer of the plurality of layers of the application containing at least one service or at least a second feature upon which the new feature is dependent;
generating a recommendation to place the new feature in the highest layer of the plurality of layers containing the at least one service or at least the second feature upon which the new feature is dependent; and
communicating to a user interface the recommendation to place the new feature in the highest layer of the plurality of layers containing the at least one service or at least the second feature upon which the new feature is dependent, wherein the user interface renders the recommendation in a screen presented on a display.

2. The method of claim 1, further comprising:
identifying a present change in a service or feature dependency of a first existing feature;
determining a highest layer of the plurality of layers of the application containing at least one service or at least a second feature upon which the first existing feature is newly dependent;
determining whether a layer of the application in which the first existing feature presently is contained is lower than the highest layer of the plurality of layers of the application containing the at least one service or at least the second feature upon which the first existing feature is newly dependent; and
responsive to determining that the layer of the application in which the first existing feature presently is contained is lower than the highest layer of the plurality of layers of the application containing the at least one service or at least the second feature upon which the first existing feature is newly dependent, rendering a second recommendation to place the first existing feature in the highest layer of the plurality of layers of the application containing the at least one service or at least the second feature upon which the first existing feature is newly dependent.

3. The method of claim 2, further comprising:
determining whether at least a third feature is dependent on the first existing feature;
responsive to determining at least the third feature is dependent on the first existing feature, determining whether a layer of the application in which the third feature presently is contained is lower than the highest layer of the plurality of layers of the application containing the at least one service or at least the second feature upon which the first existing feature is newly dependent; and
responsive to determining that the layer of the application in which the third feature presently is contained is lower than the highest layer of the plurality of layers of the application containing the at least one service or at least the second feature upon which the first existing feature is newly dependent, rendering a third recommendation to move the third feature in the highest layer of the plurality of layers of the application containing the at least one service or at least the second feature upon which the first existing feature is newly dependent.

4. The method of claim 3, further comprising:
responsive to determining at least the third feature is dependent on the first existing feature, identifying aspects of at least the third feature impacted by changing the dependency of the first existing feature; and
rendering a fourth recommendation indicating the aspects of at least the third feature impacted by changing the dependency of the first existing feature.

5. The method of claim 2, further comprising:
identifying at least a second application that uses the first existing feature; and
rendering a fifth recommendation indicating a relationship should be established between the second application and the first existing feature on the highest layer of the plurality of layers of the application containing the at least one service or at least the second feature upon which the first existing feature is newly dependent.

6. The method of claim 1, further comprising:
identifying a present change in a service or feature dependency of a first existing feature;
determining whether at least a second feature is dependent on the first existing feature;
responsive to determining at least the second feature is dependent on the first existing feature, identify aspects of at least the second feature impacted by changing the dependency of the first existing feature; and
rendering a second recommendation indicating of the aspects of at least the second feature impacted by changing the dependency of the first existing feature.

7. The method of claim 1, further comprising:
identifying at least a first existing feature for which an impact of removing the first existing feature is desired to be identified;
determining whether at least a second feature is dependent on the first existing feature;
responsive to determining that at least the second feature is dependent on the first existing feature, identifying aspects of at least the second feature impacted by removal of the first existing feature; and
rendering a second recommendation indicating at least the second feature and the aspects of at least the second feature impacted by removal of the first existing feature.

8. The method of claim 7, wherein the second recommendation further indicates at least one type of information exchanged between the first existing feature and at least the second feature impacted by removal of the first existing feature.

9. A system, comprising:
a processor programmed to initiate executable operations comprising:
identifying layer information for each of a plurality of layers defined in an application, service information for each of a plurality of services defined in the application, feature information for each of a plurality of features defined in the application, and dependency information pertaining to dependencies among the plurality of services and features by automatically analyzing program code of the application, and storing data pertaining to the identified layer information, service information, feature information and dependency information to a functional data structure;
identifying a new feature defined for the application;
processing data pertaining to the layer information, the service information, the feature information and the dependency information for the application and, based on the processing, identifying a highest layer of the plurality of layers of the application containing at least one service or at least a second feature upon which the new feature is dependent;

generating a recommendation to place the new feature in the highest layer of the plurality of layers containing the at least one service or at least the second feature upon which the new feature is dependent; and communicating to a user interface the recommendation to place the new feature in the highest layer of the plurality of layers containing the at least one service or at least the second feature upon which the new feature is dependent, wherein the user interface renders the recommendation in a screen presented on a display.

10. The system of claim 9, the executable operations further comprising:

identifying a present change in a service or feature dependency of a first existing feature;

determining a highest layer of the plurality of layers of the application containing at least one service or at least a second feature upon which the first existing feature is newly dependent;

determining whether a layer of the application in which the first existing feature presently is contained is lower than the highest layer of the plurality of layers of the application containing the at least one service or at least the second feature upon which the first existing feature is newly dependent; and responsive to determining that the layer of the application in which the first existing feature presently is contained is lower than the highest layer of the plurality of layers of the application containing the at least one service or at least the second feature upon which the first existing feature is newly dependent, rendering a second recommendation to place the first existing feature in the highest layer of the plurality of layers of the application containing the at least one service or at least the second feature upon which the first existing feature is newly dependent.

11. The system of claim 10, the executable operations further comprising:

determining whether at least a third feature is dependent on the first existing feature;

responsive to determining at least the third feature is dependent on the first existing feature, determining whether a layer of the application in which the third feature presently is contained is lower than the highest layer of the plurality of layers of the application containing the at least one service or at least the second feature upon which the first existing feature is newly dependent; and responsive to determining that the layer of the application in which the third feature presently is contained is lower than the highest layer of the plurality of layers of the application containing the at least one service or at least the second feature upon which the first existing feature is newly dependent, rendering a third recommendation to move the third feature in the highest layer of the plurality of layers of the application containing the at least one service or at least the second feature upon which the first existing feature is newly dependent.

12. The system of claim 11, the executable operations further comprising:

responsive to determining at least the third feature is dependent on the first existing feature, identifying aspects of at least the third feature impacted by changing the dependency of the first existing feature; and rendering a fourth recommendation indicating the aspects of at least the third feature impacted by changing the dependency of the first existing feature.

13. The system of claim 9, the executable operations further comprising:

identifying at least a second application that uses the first existing feature; and rendering a fifth recommendation indicating a relationship should be established between the second application and the first existing feature on the highest layer of the plurality of layers of the application containing the at least one service or at least the second feature upon which the first existing feature is newly dependent.

14. The system of claim 9, the executable operations further comprising:

identifying a present change in a service or feature dependency of a first existing feature;

determining whether at least a second feature is dependent on the first existing feature;

responsive to determining at least the second feature is dependent on the first existing feature, identify aspects of at least the second feature impacted by changing the dependency of the first existing feature; and rendering a second recommendation indicating of the aspects of at least the second feature impacted by changing the dependency of the first existing feature.

15. The system of claim 9, the executable operations further comprising:

identifying at least a first existing feature for which an impact of removing the first existing feature is desired to be identified;

determining whether at least a second feature is dependent on the first existing feature;

responsive to determining that at least the second feature is dependent on the first existing feature, identifying aspects of at least the second feature impacted by removal of the first existing feature; and rendering a second recommendation indicating at least the second feature and the aspects of at least the second feature impacted by removal of the first existing feature.

16. The system of claim 14, wherein the second recommendation further indicates at least one type of information exchanged between the first existing feature and at least the second feature impacted by removal of the first existing feature.

17. A computer program product comprising a computer readable storage medium having program code stored thereon, the program code executable by a processor to perform a method comprising:

identifying, by the processor, layer information for each of a plurality of layers defined in an application, service information for each of a plurality of services defined in the application, feature information for each of a plurality of features defined in the application, and dependency information pertaining to dependencies among the plurality of services and features by automatically analyzing program code of the application, and storing, by the processor, data pertaining to the identified layer information, service information, feature information and dependency information to a functional data structure;

identifying, by the processor, a new feature defined for the application;

processing, by the processor, data pertaining to the layer information, the service information, the feature information and the dependency information for the application and, based on the processing, identifying a highest layer of the plurality of layers of the application containing at least one service or at least a second feature upon which the new feature is dependent;

generating, by the processor, a recommendation to place the new feature in the highest layer of the plurality of layers containing the at least one service or at least the second feature upon which the new feature is dependent; and communicating to a user interface the recommendation to place the new feature in the highest layer of the plurality of layers containing the at least one service or at least the second feature upon which the new feature is dependent, wherein the user interface renders the recommendation in a screen presented on a display.

18. The computer program product of claim 17, the method further comprising:
identifying a present change in a service or feature dependency of a first existing feature;
determining a highest layer of the plurality of layers of the application containing at least one service or at least a second feature upon which the first existing feature is newly dependent;
determining whether a layer of the application in which the first existing feature presently is contained is lower than the highest layer of the plurality of layers of the application containing the at least one service or at least the second feature upon which the first existing feature is newly dependent; and
responsive to determining that the layer of the application in which the first existing feature presently is contained is lower than the highest layer of the plurality of layers of the application containing the at least one service or at least the second feature upon which the first existing feature is newly dependent, rendering a second recommendation to place the first existing feature in the highest layer of the plurality of layers of the application containing the at least one service or at least the second feature upon which the first existing feature is newly dependent.

19. The computer program product of claim 18, the method further comprising:
determining whether at least a third feature is dependent on the first existing feature;
responsive to determining at least the third feature is dependent on the first existing feature, determining whether a layer of the application in which the third feature presently is contained is lower than the highest layer of the plurality of layers of the application containing the at least one service or at least the second feature upon which the first existing feature is newly dependent; and
responsive to determining that the layer of the application in which the third feature presently is contained is lower than the highest layer of the plurality of layers of the application containing the at least one service or at least the second feature upon which the first existing feature is newly dependent, rendering a third recommendation to move the third feature in the highest layer of the plurality of layers of the application containing the at least one service or at least the second feature upon which the first existing feature is newly dependent.

20. The computer program product of claim 19, the method further comprising:
responsive to determining at least the third feature is dependent on the first existing feature, identifying aspects of at least the third feature impacted by changing the dependency of the first existing feature; and
rendering a fourth recommendation indicating the aspects of at least the third feature impacted by changing the dependency of the first existing feature.

* * * * *